Patented Jan. 25, 1949

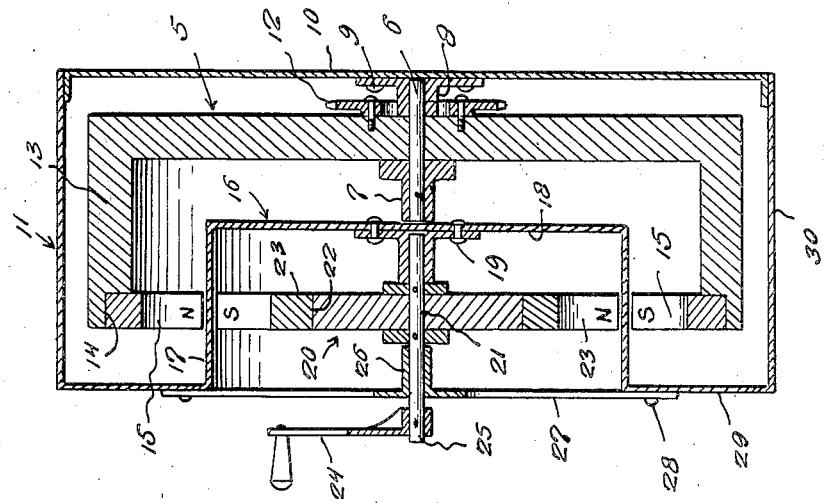
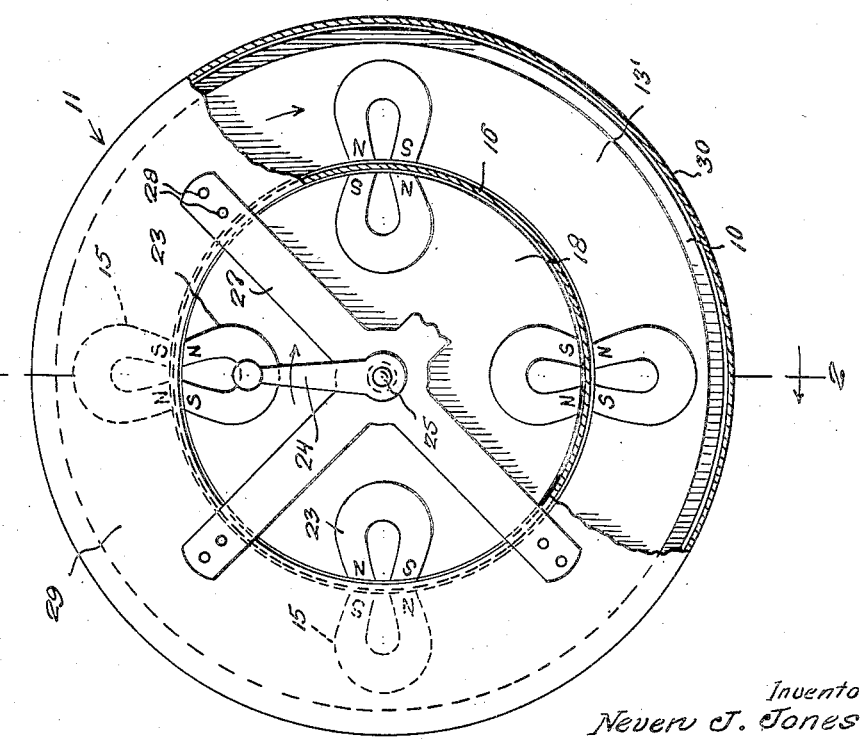

2,460,015

UNITED STATES PATENT OFFICE 2,460,015

MOTION TRANSMITTING MECHANISM

Neven J. Jones, Natrona Heights, Pa.

Application July 13, 1945, Serial No. 604,842

1 Claim. (Cl. 172—284)

My invention relates to improvements in motion-transmitting mechanism wherein the rotation of a drive element is imparted to a driven element solely through magnetic coupling, the primary object of the invention being to provide a magnetic transmission of this character wherein the drive and driven elements are positively isolated and shielded from each other in such a way that there can be no immediate or direct exchange or transfer between said elements of solids, liquids, or gases to which either or both elements may be subjected.

Another important object of the invention is to provide a magnetic transmission of the character indicated, having concentric magnetic rotors mounted on coaxial shafts, wherein the rotors on the one hand and the shafts of the rotors on the other hand, are devoid of mechanical connection with each other and have separate supporting means, and wherein the separate supporting means may be integrated with or made separate from the means used to isolate the rotors from each other, and wherein by means of obvious mechanical expedients the drive rotor and the driven rotor may be reversed in position or in function.

Another important object of the invention is to provide a magnetic transmission of the character indicated wherein the means used for one or the other of the rotors for isolating them from each other may readily be constructed as a part of the driving means for the drive rotor or as a part of the mechanism operated by the driven rotor, and wherein the entire transmission may readily be enclosed so as to be harmlessly operable while submerged in liquid or gas.

Other important objects and advantages of the invention will appear in the following description of the appended drawings, wherein for illustration only, a preferred embodiment of the invention is set forth.

In the drawings:

Figure 1 is an end elevation of said embodiment partly broken away to show internal mechanism.

Figure 2 is a central transverse vertical section taken along the line 2—2 of Figure 1 and looking in the direction of the arrows.

Referring in detail to the drawings, the numeral 5 generally designates the outer circular rotor which is fastened on an axial shaft 6 or merely turns thereon, and is held against endwise movement in one direction by a collar 7 on said shaft and in the other direction by the bearing 8 in which the shaft 7 is rigidly or rotatably mounted, as the case may be.

The bearing 8 can have any suitable support but in the present illustration is fixed by a riveted flange 9 to a wall 10 forming a part of a drum-shaped housing 11 concentrically surrounding the rotor 5. A suitable means, in this case a pinion 12, is mounted concentrically on the rotor 5 for mechanical connection with either driving means or driven means, as the case may be.

The rotor 5, which may be heavy enough for flywheel action, has at its periphery an annular rim 13 having an annular flange 13' which is provided at equally circumferentially spaced intervals with horseshoe-shaped recesses 14 in its inner surface in which are conformably received horseshoe permanent magnets 15 with their poles directed radially inwardly and shaped at their inner ends flush with the inner edge of the flange 13' and to make with it the closest possible approach to the outside surface of the annular rim 17 of a cup-shaped casing 16, without actually touching the rim of the casing.

The center of the wall 18 has fixed thereon a tubular bearing 19 which is axially aligned with the rotor shaft 6, the bearing 19 rotatably and supportably receiving the adjacent end of the shaft 21 of the second rotor 20 which is disc-shaped and fixed on the shaft 21. The periphery of the inner or second rotor 20 is circumferentially recessed, as indicated at 22, to accommodate horseshoe permanent magnets 23 which have their poles directed radially outwardly with their outer ends formed to make the closest feasible non-touching approach to the inner surface of the rim 17 of the casing 16.

The rotors have the same number of permanent magnets spaced at the same circumferential intervals and the magnets are all substantially of the same size and strength, with the polarity of the opposed magnets on the two rotors reversed.

The inner rotor shaft 21 may, as herein shown, be extended to provide for mechanically connecting the second rotor with driving or driven means, as the case may be, and in this instance a crank handle 24, illustrated as the driving means, is fixed on the extension 25 of the shaft, and said extension is given support by a bearing 26 on a spider plate 27 traversed by said extension, which spider plate may be present to close the opening of the casing 16 by connection, as indicated at 28, with a flange 29 on said casing. The said casing flange 29 may merge into an annular wall 30 forming part of the housing 11 which includes the wall 10 already described.

In order to get the fullest results, the rotors and their shafts, and the inner casing must be of non-magnetic material.

It will be understood that the mounting and support of the described rotor shafts may be varied or exchanged in accordance with requirements and the uses to which the device of the invention may be put and the mechanism with which the device may be associated, and a similar latitude of rearrangement applies to the form and positioning of the casing 16 and the outer housing 11.

It will be understood that upon the turning of either one of the rotors the force of the mutual attraction of the opposed poles of their magnets will cause the other rotor to turn in the same direction and eventually reach synchronism therewith, and that the effective strength of the coupling between the rotors depends upon the number and strength of the magnets and the smallness of the distance between the reacting magnets provided for between the rotors, other factors such as mechanical friction being constant.

I claim:

A magnetic clutch comprising a closed cylindrical main casing having one end thereof formed to provide an axial cylindrical indentation constituting a secondary casing, isolated from the interior of said main casing, an outer cup-shaped rotor supported from the opposite end of said main casing to rotate axially within said main casing, said outer rotor being of non-magnetic material and comprising a rim portion circumferentially spaced from and surrounding the periphery of said secondary casing, a radially inwardly projecting annular flange on said rim portion formed at equally circumferentially spaced intervals with horse-shoe shaped recesses opening through the radially inward edge of said annular flange close to the periphery of said secondary casing, an inner rotor comprising a non-magnetic disk supported from an end of said secondary casing to rotate axially within said secondary casing in axial alignment with said outer rotor, the periphery of said disk running close to the inner surface of the periphery of said secondary casing in the same plane as said annular flange of the outer rotor, the periphery of said disk being formed with equally circumferentially spaced horse-shoe shaped recesses opening therethrough and horse-shoe magnets positioned in the recesses of the outer and inner rotors with the poles of the outer rotor magnets facing the poles of the inner rotor magnets and being of opposite polarity.

NEVEN J. JONES.

REFERENCES CITED

The following references are of record in the file of this patent:

UNITED STATES PATENTS

| Number | Name | Date |
|---|---|---|
| 1,608,231 | Bradley | Nov. 23, 1926 |
| 1,696,132 | Wermeille | Dec. 18, 1928 |
| 1,963,376 | Papas | June 19, 1934 |
| 2,346,904 | Carlson | Apr. 18, 1944 |
| 2,366,562 | Schug | Jan. 2, 1945 |
| 2,381,211 | Crittenden | Aug. 7, 1945 |

FOREIGN PATENTS

| Number | Country | Date |
|---|---|---|
| 410,589 | Great Britain | May 24, 1934 |
| 592,048 | France | Apr. 23, 1925 |
| 636,699 | Germany | Oct. 13, 1936 |